United States Patent
Dankert et al.

(10) Patent No.: US 7,730,668 B2
(45) Date of Patent: Jun. 8, 2010

(54) MOTOR VEHICLE EGRESS WINDOW

(75) Inventors: Daryl F. Dankert, Osceola, IN (US);
Michael D. Kobrehel, Elkhart, IN (US);
Darren M. Grumm, Cassopolis, MI (US)

(73) Assignee: Dura Global Technologies, LLC, Rochester Hills, MI (US)

( * ) Notice: Subject to any disclaimer, the term of this patent is extended or adjusted under 35 U.S.C. 154(b) by 933 days.

(21) Appl. No.: 11/336,732

(22) Filed: Jan. 20, 2006

(65) Prior Publication Data
US 2006/0175866 A1 Aug. 10, 2006

Related U.S. Application Data

(60) Provisional application No. 60/645,812, filed on Jan. 21, 2005.

(51) Int. Cl.
*E05B 65/10* (2006.01)
(52) U.S. Cl. .................................................. 49/141
(58) Field of Classification Search .................. 49/141, 49/57, 463, 466, 394
See application file for complete search history.

(56) References Cited

U.S. PATENT DOCUMENTS

| | | | | |
|---|---|---|---|---|
| 3,927,492 A | * | 12/1975 | Carson | 49/141 |
| 3,942,286 A | | 3/1976 | Ehret et al. | |
| 4,283,885 A | * | 8/1981 | Remick et al. | 49/466 |
| 4,313,280 A | | 2/1982 | Ehret et al. | |
| 5,787,643 A | * | 8/1998 | Schmuck | 49/141 |
| 5,893,600 A | * | 4/1999 | McManus | 296/146.16 |
| 5,941,022 A | * | 8/1999 | Schmuck | 49/141 |
| 6,340,202 B1 | * | 1/2002 | Stanton et al. | 296/201 |
| 6,341,748 B1 | * | 1/2002 | Brooks et al. | 244/129.5 |
| 6,367,200 B1 | * | 4/2002 | LaConte | 49/465 |
| 6,412,225 B1 | * | 7/2002 | McManus | 49/381 |
| 6,726,271 B2 | * | 4/2004 | Stanton et al. | 296/146.15 |
| 6,779,580 B2 | * | 8/2004 | Woodward et al. | 160/92 |
| 6,932,395 B1 | * | 8/2005 | du Bois | 292/336.3 |

\* cited by examiner

*Primary Examiner*—Jerry Redman
(74) *Attorney, Agent, or Firm*—Banner & Witcoff Ltd.; Peter M. McDermott; Dean B. Watson

(57) ABSTRACT

A motor vehicle egress window comprises a circumferential outer frame forming an auxiliary egress opening for a motor vehicle passenger compartment and an inner frame unit. The outer frame has an outer frame member with an inner surface and at least a first striker pin. The inner frame unit is mounted to the outer frame for movement between closed and open positions has a circumferential inner frame, a glazing pane mounted to the inner frame, at least a first egress latch mounted to the inner frame, and a release mechanism. The egress latch is operative to latch to the striker pin to hold the inner frame unit in the closed position. The release mechanism includes a manually operative release handle, preferably mounted at an elevated position on a vertical side portion of the inner frame, and release linkage comprising at least a first link from the release handle to the first latch. In certain embodiments the inner and outer frames overlap radially for improved functionality.

12 Claims, 5 Drawing Sheets

MOTOR VEHICLE EGRESS WINDOW

PRIORITY CLAIM

This application claims priority from U.S. provisional application 60/645,812 filed Jan. 21, 2005.

FIELD OF THE INVENTION

This invention relates to improvements in passenger vehicle egress windows and more particularly for egress windows suitable to provide emergency or other auxiliary egress from the passenger compartment of buses, railroad passenger cars or other mass transit vehicles.

BACKGROUND

It is known to use egress windows in various passenger vehicles, such as buses, railroad passenger cars and the like, to provide auxiliary means of egress for passengers to exit the vehicle quickly with little effort. Typically, such windows include a glazing panel in a frame hinged along one edge to the wall of the vehicle and a latch mechanism to releasably hold the framed panel in the closed position. By operation of the latch mechanisms the window can be quickly unlocked or disengaged and removed or allowed to pivot outward, thereby allowing passengers to leave the vehicle through the window opening. In motor vehicle applications, e.g., for use in passenger buses and the like, latching egress window assemblies of this type often must meet stringent specifications with respect to preventing unintended opening under substantial loading. Also, they must provide a watertight seal against the weather. Often, they also must meet other requirements, e.g., for low vibration noise, etc.

Various egress window designs and associated latch mechanisms are known. In the egress windows of U.S. Pat. No. 3,942,286, which is incorporated herein by reference in its entirety for all purposes, a latch assembly comprises a release bar hingedly mounted to the frame of a window. The release bar is snap-fit over a keeper bar such that lifting the release bar allows the window to be opened. The egress windows of U.S. Pat. No. 4,313,280, which is incorporated herein by reference in its entirety for all purposes, have an adjustable keeper. Another known egress window assembly design employs a keeper mounted to a wall, a release bar with a show surface (i.e., a surface exposed to the view of passengers) mounted to a lower frame of the window assembly and a release bar retention block to hold the release bar in an up position, keeping the release bar from contacting the wall and possibly damaging the show surface of the release bar when the window is pivoted. In U.S. Pat. No. 5,941,022, which is incorporated herein by reference in its entirety for all purposes, egress windows are disclosed employing an improved latch assembly having enhanced latch strength and improved release bar retention to prevent scuffing or scratching of the interior show surface of the release bar. In certain exemplary embodiments of such egress windows, the window can be closed and a latch member engaged without returning the release bar to its full down position.

Improvements are needed or desired in egress windows, especially in egress windows for passenger vehicles, such as buses, railroad passenger cars and the like. In general, for example, improved performance is sought in the protection of the lock or latch mechanism against the infiltration of contaminates during use over time. In addition, egress windows are wanted which require reduced opening effort once the latch is released, i.e., reduced push out effort. It is an object of the present invention to provide egress windows having some or all of these performance improvements. Additional objectives will become apparent from the following disclosure.

SUMMARY OF THE INVENTION

In accordance with a first aspect, an egress window is provided for a motor vehicle. The egress window is operative to provide egress from the passenger compartment of a vehicle in which it is (or is intended in future to be) installed, typically as one of multiple windows in the side of the vehicle body. Thus, the egress window assemblies disclosed here generally are employed to provide emergency or other auxiliary egress from the passenger compartment of a motor vehicle. The egress window assembly in accordance with this first aspect comprises a circumferential outer frame forming an auxiliary egress opening for a motor vehicle passenger compartment and an inner frame unit mounted to the outer frame for movement between a closed position in which it closes the auxiliary egress opening formed by the outer frame and an open position. In certain exemplary embodiments the inner frame is hingedly mounted along the top of the outer frame, such that it can be pushed outwardly from the passenger compartment at the bottom to swing open for auxiliary egress. The outer frame comprises an outer frame member having an inner surface that forms at least a portion of the egress opening, optionally a full circumference, continuous inner surface, e.g., a molded surface, such as an extruded or injection molded surface. The outer frame comprises also comprises at least a first striker pin. As used here, the aforesaid inner surface of the outer frame member is "inner" at least in the sense that it mates with or seats against (with or without intermediate sealing members or the like) the inner frame of the egress window and/or in the sense that it faces radially (alternatively referred to as laterally) inward, i.e.; generally toward the center area of the egress opening, although in certain exemplary embodiments it may have a configuration such that some or all of it also faces inboard or outboard, i.e., generally normal or perpendicular to the overall plane of the window, into or out of the passenger compartment. As used here the inner surface of the outer frame member is a "full circumference" surface in certain exemplary embodiments at least in the sense that it extends circumferentially an entire 360° around the egress opening, as discussed further below, typically itself forming some or all of the egress opening.

The inner frame unit of the egress window assembly comprises a circumferential inner frame, a glazing pane mounted to the circumferential inner frame, at least a first egress latch mounted to the circumferential inner frame and operative when the inner frame unit is in the closed position to latch to the first striker pin of the outer frame to hold the inner frame unit in the closed position, and a release mechanism. The release mechanism comprises a manually operative release handle mounted to the circumferential inner frame, having a latched position and an unlatched position, and release linkage. The release linkage comprises at least a first link from the release handle to the first latch, operative upon operation of the release handle from the latched position to the unlatched position to open the egress latch to release the striker pin to free the inner frame unit to move to the open position. In certain exemplary embodiments wherein the window assembly or at least the inner frame unit of the window assembly has a horizontal upper portion and a horizontal lower portion, each being straight and parallel with one another, and a vertical left side portion and a vertical right side portion, each being straight and parallel with one another, the release handle is mounted on a vertical side portion of the inner frame unit at a height above the lower horizontal portion sufficient to be easily accessible and to avoid interference with the passenger seats, etc. In certain such embodiments the release handle is mounted at a height at least one quarter of the way up from the lower horizontal portion of the window assembly to the upper horizontal portion, e.g., about one-third or one-half of the way up or even higher.

In certain exemplary embodiments the release linkage of the egress window assembly includes at least a flexible cable forming the first stage of the release mechanism linkage, i.e., the linkage between the manually operative release handle and the first of the multiple egress latches carried by the inner frame unit, i.e., the first egress latch encountered following the inner frame member (i.e., following the circumferential contour of the inner frame starting from the release handle). Preferably the cable runs along (i.e., in or on, etc.) a circumferentially extending rail, meaning a trough, a rabbet or other such circumferentially extending contour suitable to protect, hide or guide the cable. From the first latch to a second latch, if any, especially where the first latch and such second latch are mounted on the same straight portion of the inner frame unit, the linkage may be flexible or rigid. For example, such second stage of the linkage may comprise a rigid link, e.g., a flat or round rod or the like, between circumferentially adjacent latches. As use here, an egress latch is "circumferentially adjacent" to another egress latch of the egress window assembly if it is the next egress latch encountered moving circumferentially along the inner frame.

In certain exemplary embodiments the egress window assemblies closed here, the egress opening has a horizontal upper portion and a horizontal lower portion, each being straight and parallel with one another, and a vertical left side portion and a vertical right side portion, each being straight and parallel with one another. In such exemplary embodiments, optionally at least the first egress latch is mounted on the lower horizontal segment and the release handle is mounted on a vertical side segment.

Those skilled in the art will recognize that various advantages can be realized with at least certain exemplary embodiments of the egress window assemblies disclosed here. At least certain embodiments of the egress window assemblies disclosed here provide advantageous function during release or unlatching of the inner frame unit due, in part, to the striker pin(s) being mounted on the outer frame. At least certain embodiments of the egress window assemblies disclosed here having the release handle on a vertical side portion of the inner frame can advantageously eliminate the traditional large egress bar along the bottom of the frame. Optionally a decorative fascia or the like can be employed to maintain a consistent appearance with other windows in the motor vehicle. At least certain embodiments of the egress window assemblies disclosed here employing rotary locks, e.g., rotary slam locks with a biasing member to automatically open the egress window upon unlatching, advantageously avoid the ill effects of forcing the latches and the like. At least certain embodiments of the egress window assemblies disclosed here employing overlapping inner and outer frames can provide the advantage of reduced infiltration of contaminants and/or improved weather sealing and the like. These and other advantages of the invention or of certain exemplary embodiments will be better understood in view of the detailed description provided below of certain exemplary embodiments.

BRIEF DESCRIPTION OF THE DRAWINGS

Certain exemplary embodiments of the egress windows disclosed here are described below with reference to the appended drawings wherein.

Figure 1:
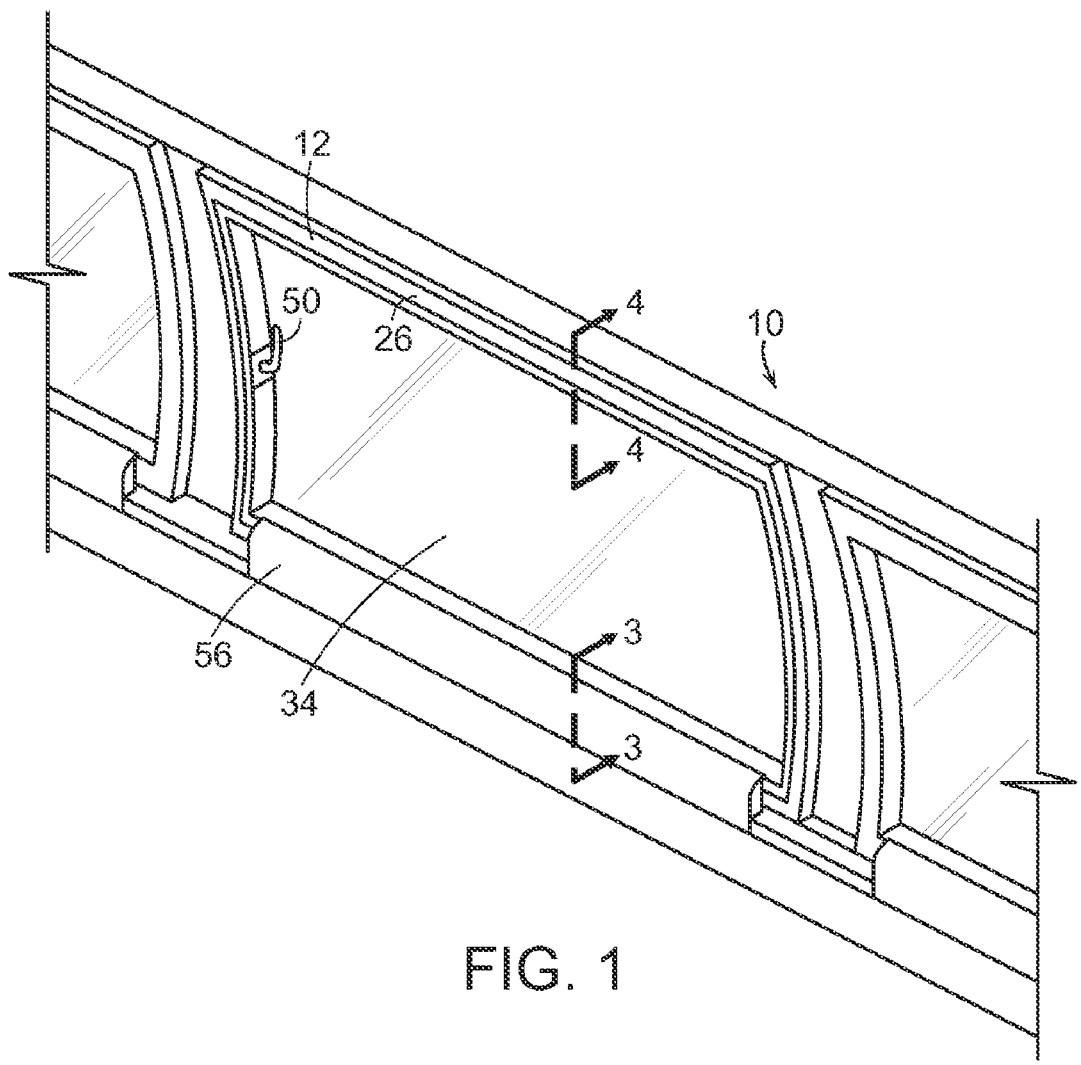
FIG. 1 is a schematic perspective view, partially broken away, of a series of mass transit passenger compartment windows, including an egress window in accordance with the present disclosure.

The same reference numeral is used for a given feature or element in different drawings. It should be understood that the drawings are schematic and not necessarily to scale, to permit greater clarity in the disclosure and description of the invention. All directional references appearing in the discussion below refer to the orientation shown in the drawings unless stated otherwise. It should be understood, however, that the egress window assemblies discussed here can be used in many different applications and orientations, including, e.g., vertical or horizontal hinged window assemblies, etc.

DETAILED DESCRIPTION OF CERTAIN PREFERRED EMBODIMENTS

It will be understood by those who are skilled in this area of technology that the window assemblies disclosed and described herein are suitable for use in numerous applications, including especially mass transit passenger vehicles. For purposes of illustration, various preferred and alternative features and aspects of the invention are now described in the context of a hinged egress window assembly for a passenger bus. It should be understood, however, that the invention is not limited to this particular application, either in general or as to its particular features and elements.

Typically, an egress window assembly in accordance with this disclosure will be designed for a particular application, e.g., to fit into a particular gross window opening formed by a motor vehicle body. In certain exemplary embodiments the outer frame member of the egress window assembly together with the inner frame unit, and in certain exemplary embodiments even without the inner frame unit, is sufficiently structurally integrated to support itself prior to installation into the gross opening provided in the motor vehicle body. Such "self supporting" egress window assemblies advantageously tolerate forces typically encountered during handling, shipping and installation of the egress window assembly into the body of a motor vehicle. In addition, they typically are well adapted to temporary removal from the vehicle body for maintenance, repairs, etc. In certain exemplary embodiments the outer frame provides an inside surface configured to mate with the IF and an outside surface configured to mate with the gross window opening of the motor vehicle. As used here and in the appended claims, an inside surface of the outer frame "mates" with the inner frame unit in the sense that it sits closely adjacent or otherwise seats, sealingly or not, to the inner frame unit (i.e., seats in, on, onto, against, or with the inner frame unit), optionally with one or more intermediate sealing members integrated into one or both of them, around the perimeter of the auxiliary egress opening. Preferably they seat to each other continuously around the full circumference of the egress opening and in a weather sealing manner, when the inner frame unit is in the closed and latched position.

In certain exemplary embodiments the outer frame comprises at least one circumferentially extending supplemental outer frame member. Such supplemental outer frame member(s) may be fill circumference or partial circumference, and may be attached to the outer frame member (e.g., mounted to or with or otherwise secured and integrated with the outer frame member) either directly or indirectly. In certain exemplary embodiments of the motor vehicle egress window assemblies disclosed here, the outer frame has multiple striker pins mounted to the outer frame unit at a location circumferentially spaced from each other. Correspondingly, in such embodiments the inner frame unit typically will comprise an egress latch for each striker pin. Each such egress latch is mounted to the inner frame unit at a location aligned with a corresponding one of the striker pins and is operative when the inner frame unit is in the closed position to latch to the corresponding striker pin to cooperate in latching the inner frame unit in the closed position. The release linkage in such exemplary embodiments preferably includes at least one additional link from the first egress latch to the circumferentially adjacent (i.e., the next) egress latch, and a link from that second latch to the third, if any, and so on. Numerous alternative latch arrangements suitable for the egress window assemblies disclosed here, with any suitable number and placement of striker pins and latches, will be apparent to those skilled in the art given the benefit of this disclosure.

As noted above, the striker pins are mounted, directly or indirectly, to the outer frame for latching the inner frame to the outer frame. As used here and in the appended claims, the striker pins are mounted to the outer frame in the sense that they are mounted, e.g., in, into, on or onto the outer frame, and unless otherwise clear from context, any and all such terms are used here interchangeably. In certain exemplary embodiments the outer frame comprises components additional to the outer frame member and the striker pins. For example, in addition to one or more striker pins mounted to the outer frame, preferably to the outer frame member itself, there may be one or more other components, e.g., supplemental outer frame members fastened to or otherwise joined with the outer frame member to form the outer frame. Other additional components may include, e.g., weather sealing, decorative trim pieces, etc. The outer frame's hinge part for mounting the inner frame to the outer frame may be a unitary part of the outer frame member. Alternatively, it may comprise one or more components attached, directly or indirectly, to the outer frame member. In embodiments having a direct attachment by fasteners, for example, such hinge component(s) may be fastened to the outer frame member by, e.g., one or more screws, rivets or other fasteners extending into the body of the outer frame member. In embodiments having a direct attachment by adhesive, the adhesive typically forms an interfacial layer contacting the surface of the outer frame member itself and the surface of the hinge component. Other direct attachment techniques, such as insert molding, etc. will be apparent to those skilled in the art given the benefit of this disclosure. In alternative embodiments employing indirect attachment of a hinge component to the outer frame member, the hinge member can be directly attached to an intermediate item, e.g., a supplemental outer frame member, which itself is directly or indirectly attached to the outer frame member. Numerous other alternative and additional components for the outer frame will be apparent to those skilled in the art given the benefit of this disclosure, particularly in view of any unique requirements of a particular egress window application. The principles just described with respect to the meaning of direct and indirect attachment of outer frame components to the circumferential outer frame member should be understood to apply generally to any and all other direct or indirect component attachments mentioned elsewhere in this disclosure and/or in the appended claims.

The inner surface of the outer frame member defining the auxiliary egress opening for a motor vehicle passenger compartment in certain exemplary embodiments is continuous circumferentially at least from the vertical left side portion to the horizontal lower portion to the vertical right side portion. In certain exemplary embodiments it is continuous around the entire circumference or periphery of the egress opening. The surface—or a certain circumferentially extending portion of the surface—is "continuous" in accordance with certain exemplary embodiments in that it is an uninterrupted, un-seamed solid surface along that portion of the egress opening (e.g., along the entire 360° periphery of the egress opening). Alternatively, it may be "continuous" in that it is formed at least in part by a unitary (i.e., one-piece) member, e.g., a unitary injection molded frame piece that extends along that portion of the egress opening, e.g., all the way around (i.e., 360°) the egress opening. In certain alternative embodiments the inner surface of the outer frame member defining the auxiliary egress opening for a motor vehicle passenger compartment is "continuous" in the sense that there are no structurally and mechanically significant gaps in the circumference formed by the outer frame member, e.g., where the inner frame would contact instead a surface of the vehicle body, such as, e.g., a header or overhead support beam of the vehicle body or a sill beam or the like defining part of the vehicle's gross opening for the egress window assembly. It should be understood that the outer frame member is "continuous," as that term is used here and in the appended claims notwithstanding that its inside surface and/or others of its surfaces may have sockets or through-holes for fasteners, drainage or other functions, other recesses, open or sealed radial seams (i.e., cross-sectional seams perpendicular to the primary longitudinal axis of the outer frame member at the site of the seam, e.g., corresponding to the cross-section viewed in FIG. 3 or FIG. 4), open or sealed circumferential seams (i.e., seams generally in the plane of the egress window assembly) extending longitudinally along some or all of the outer frame member, indentations, notches, rabbets, channels or other rails or other contours etc. suitable for meeting the specific needs of an egress window for a particular motor vehicle. In certain exemplary embodiments the outer frame member is molded, e.g., extruded, stamped, injection molded, etc. of any suitable plastic, metal or other suitable material. Other frame members of the outer frame and frame members of the inner frame may be formed by the same techniques and of the same materials.

The inner frame typically will comprise multiple components. For example, there may be multiple inner frame members fastened or otherwise joined together, directly or indirectly, to form the inner frame. Additional components may be included for weather sealing, vibration damping, permanently or removably mounting the one or more glazing panes (optionally including removable sacrificial glazing panes) of the egress window, etc. In certain exemplary embodiments the inner frame unit has at least one circumferentially extending supplemental inner frame member. Numerous other alternative and additional components for the inner frame will be apparent to those skilled in the art given the benefit of this disclosure, particularly in view of any unique requirements of a particular egress window application.

The outer frame member in certain exemplary embodiments is "fully circumferential" or "forms a full circumference" in that it extends continuously around the entire perimeter of the egress opening, i.e., the opening created for passenger egress when the inner frame unit is unlatched from the outer frame member and removed or swung out of the way. In certain exemplary embodiments the outer frame member forms the outmost periphery of the egress window assembly. The outer frame member is not necessarily round or any other shape or configuration. Rather, the outer frame member in any given embodiment has a shape suitable to the intended use of the egress window assembly, that is, suitable to fit the perimeter of a gross window opening in the vehicle into which the egress window assembly is to be installed. In certain exemplary embodiments the circumferential outer frame member is square or rectangular in overall shape, with broadly curved or radiused corners, such as in the embodiment shown in FIGS. 1-7. The inner frame in any given embodiment has a shape suitable to fit to the outer frame member. The inner frame in certain exemplary embodiments is "circumferential" in that it extends around the one or more glazing panes of the egress window assembly and fits to the outer frame member. While the inner frame typically forms a full and continuous circumference or periphery for the glazing pane(s), in certain exemplary embodiments it may be discontinuous or partial, for example to facilitate installation or assembly. Likewise, while the outer frame member typically forms a full and continuous circumference or periphery, in certain exemplary embodiments it may be discontinuous or partial, for example to facilitate installation or assembly. In certain exemplary embodiments the outer frame member has a continuous circumferential seal to the vehicle body around the periphery of the gross window opening, the inner frame in the closed window position has a continuous circumferential seal to the outer frame member, and the glazing pane(s) has a continuous circumferential seal to the inner frame. Thus, in combination, the egress window assembly components in such embodiments form a weather-tight seal when the inner frame is in the closed window position.

As noted above, the inner surface of the outer frame member is "inner" at least in the sense that it mates with, e.g., seats against (with or without intermediate sealing members or the like) the inner frame of the egress window and/or in the sense that it faces radially (alternatively referred to as laterally) inward, i.e., generally toward the center area of the egress opening. In that regard, in certain exemplary embodiments the inner frame and outer frame are overlapping, e.g., radially overlapping each other around at least a portion of the circumference of the egress opening of the egress window assembly. In certain exemplary radially overlapping designs where the inner frame opens to outboard, an inboard flange or ridge or other surface of the outer frame extends radially (i.e., laterally, meaning generally in the plane of the window assembly) inward generally toward the center area of the egress opening, and typically therefore toward the center of the glass, plastic or other glazing pane(s) held by the inner frame. In the closed position the inner frame in such embodiments sits adjacent such inboard surface of the outer frame. Weather seals and the like can be provided at the overlap. Innumerable other suitable overlapping designs will be apparent to those skilled in the art given the benefit of this disclosure.

In certain exemplary embodiments the release linkage of the motor vehicle egress windows disclosed here comprises a tensioning element, such as, e.g., a coil spring or the like, positioned between the release handle and the first egress latch, e.g., between a flexible cable forming the first link and the first egress latch. Such coil spring is operative to accommodate over-travel of the release handle from the latched position past the unlatched position. Such accommodation of over travel can aid in preventing or reducing damage to the release mechanism of the egress window assembly if the release handle is forced past its normal travel range from its latch position (i.e., the handle position corresponding to the egress latch(es) being in the latched position) to its release position (i.e., the handle position corresponding to the egress latch(es) being in the unlatched position). The tensioning element also can aid in establishing the proper adjustment and fit of the release mechanism in the installed egress window assembly, thereby reducing or eliminating rattle or other vibration noise and the like in the release mechanism. One or more other tensioning elements can be used in addition to or in lieu of the first tensioning element mentioned above. It will be within the ability of those skilled in the art given the benefit of this disclosure, to select and employ one or more such tensioning elements.

In accordance with certain exemplary embodiments of the motor vehicle egress windows disclosed here, the first egress latch and/or any additional egress latches employed in the egress window assembly is a slam latch. In certain exemplary embodiments the latch(es) are rotary slam latches. Optionally the egress latches include a spring operative upon unlatching to bias the inner frame toward the open position. Such action advantageously indicates the proper direction for pushing the inner frame of the egress window assembly to use the auxiliary egress opening. Alternatively or in addition, one or more frame-mounted biasing members or the like can be employed. Suitable slam latches, including suitable rotary slam latches are commercially available or readily designed and produced by those skilled in the art given the benefit of this disclosure. Exemplary slam latches, including suitable rotary slam latches are commercially available, for example, from Eberhard Hardware Manufacturing Ltd. (Tillsonburg, Ontario, Canada).

The components of the egress window assembly can be assembled in any suitable order or sequence. Similarly, the components of the outer frame member, inner frame unit and any other sub-assemblies or parts of the egress window assembly can be assembled in any suitable order or sequence. In certain exemplary embodiments the outer frame member is injection molded with striker pins and optionally other items included as insert molded components. In certain exemplary embodiments the inner frame unit can be produced as a sub-assembly and then mounted to the outer frame member, while in other embodiments the components of the inner frame unit can be assembled to the egress window assembly separately or in sub-combinations of components. Additional and alternative assembly methods and techniques will be apparent to those skilled in the art, given the benefit of this disclosure.

While there are numerous alternative embodiments of the egress window assemblies disclosed here, certain exemplary embodiments comprise an outer frame and an inner frame, wherein the outer frame forms the auxiliary egress opening for a motor vehicle passenger compartment. The egress opening in these exemplary embodiments has a horizontal upper portion and a horizontal lower portion, each being straight and parallel with one another, and a vertical left side portion and a vertical right side portion, each being straight and parallel with one another. The outer frame comprises a one-piece outer frame member having a circumferentially continuous, molded inner surface with multiple striker pins mounted directly to the outer frame member and oriented to extend radially inwardly from the molded inner surface. The outer frame member also has an upwardly open outer frame hinge hook extending from the outer frame member along the horizontal upper segment. The inner frame unit is hingedly mounted to the outer frame for swinging movement between a closed position in which it closes the auxiliary egress opening formed by the outer frame and an open position. The inner frame unit has a one-piece inner frame member with a circumferentially continuous molded surface configured to mate with a corresponding portion of the circumferentially continuous molded inner surface of the outer frame member when the inner frame is in the closed position. The inner frame unit also has at least one glazing pane mounted in the inner frame and multiple rotary slam latches, each mounted to a horizontal lower portion of the inner frame member and operative when the inner frame is in the closed position to latch to a corresponding one of the striker pins of the outer frame to releasably hold the inner frame unit in the closed position. The inner frame unit also has a release mechanism comprising a manually operative release handle mounted to a vertical side portion of the inner frame and release linkage comprising a flexible cable in a circumferentially extending rail of the inner frame at least from the release handle to a first one of the rotary slam latches mounted to the horizontal lower portion of the inner frame. A rigid link member then extends from the first rotary slam latch to a second rotary slam latch. The release mechanism is operative upon operation of the release handle to simultaneously unlatch the multiple rotary slam latches to release the striker pins to free the inner frame unit to move to the open position. The inner frame unit also has a downwardly open inner frame hinge hook extending along an upper horizontal portion of the inner frame member, which is received by the outer frame hinge hook.

Figure 3:
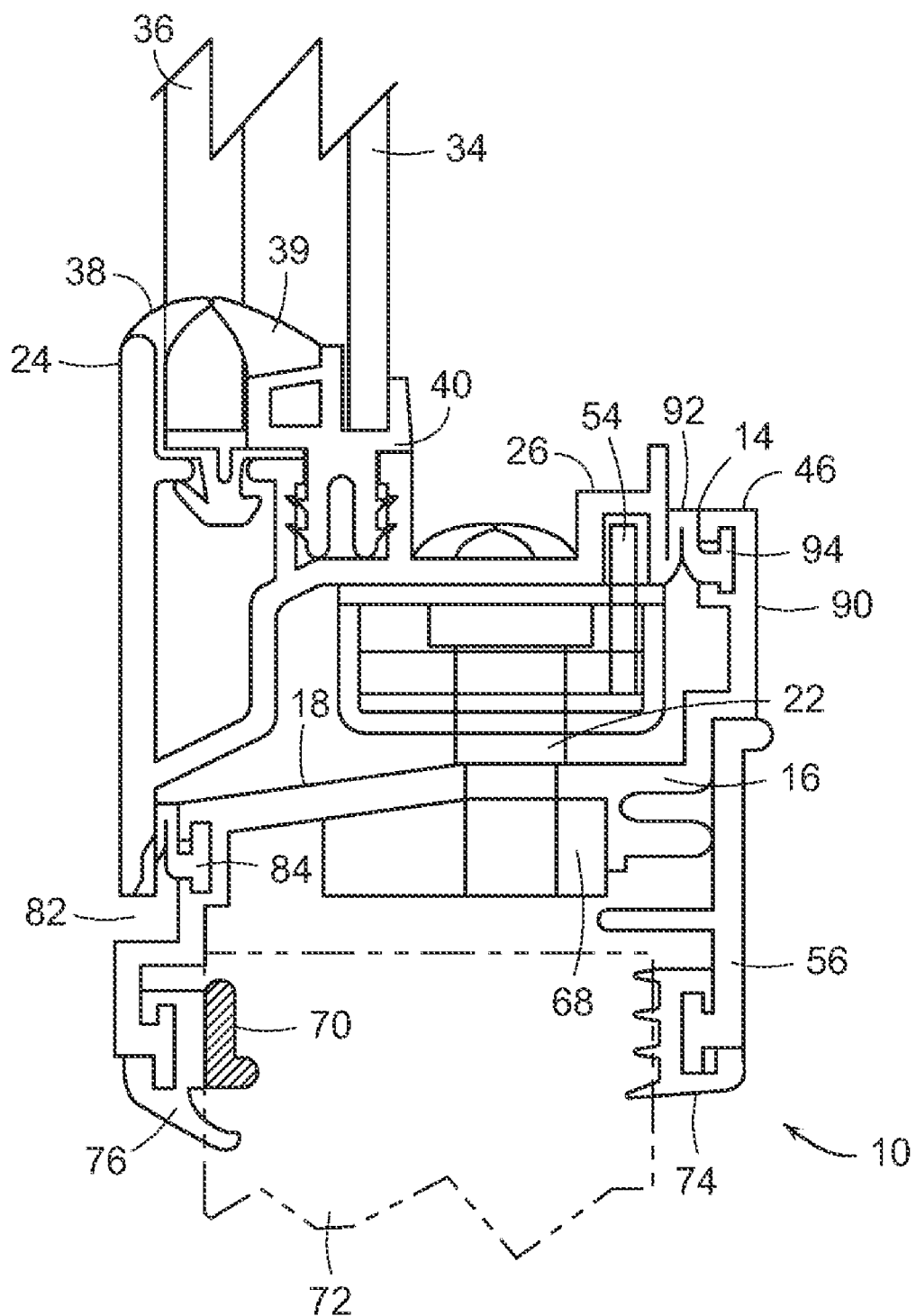
FIG. 3 is a schematic section view, partially broken away, taken through line 3-3 of FIG. 1, but with the glazing panes removed.
Figure 4:
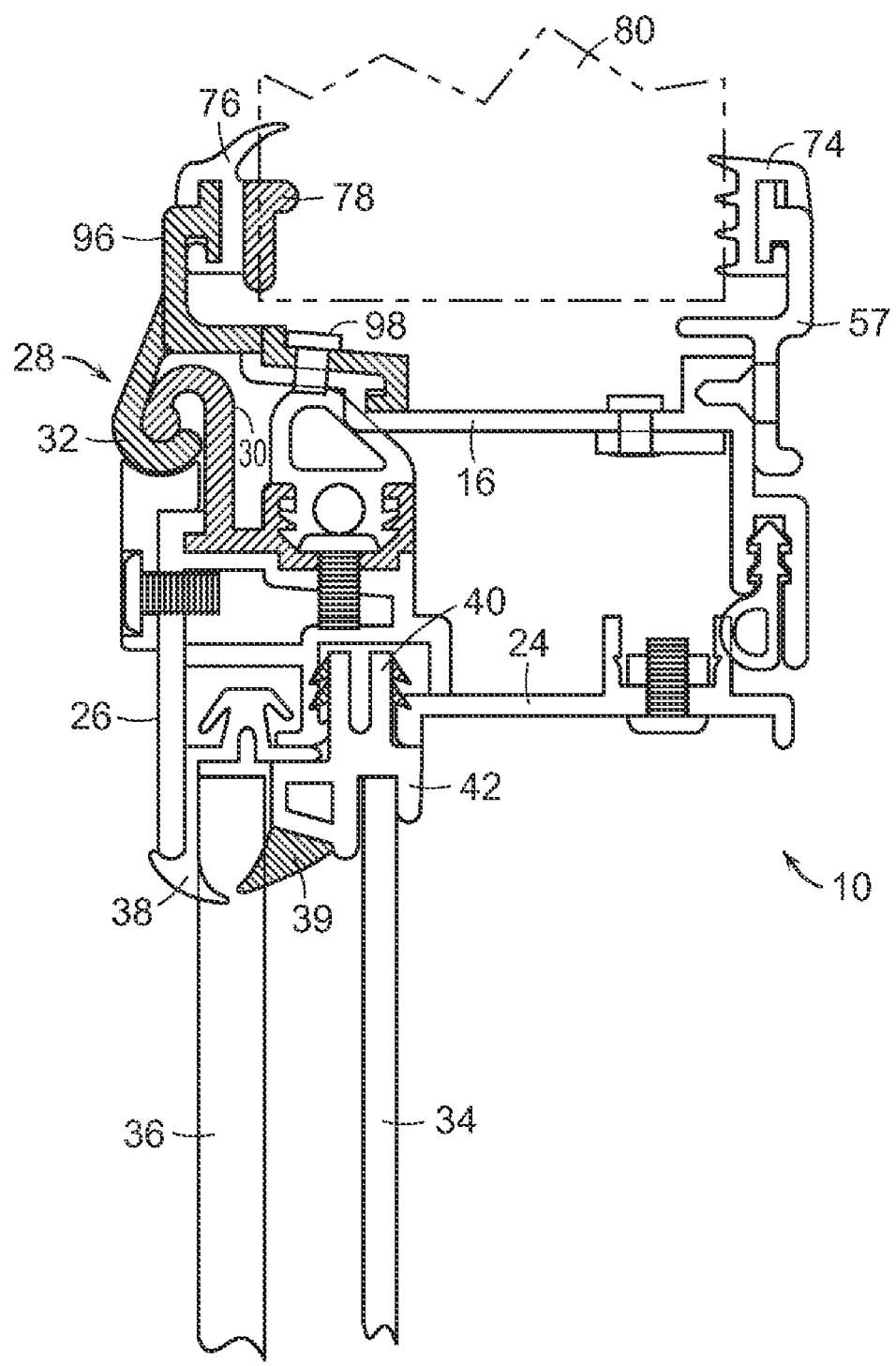
FIG. 4 is a schematic section view, partially broken away, taken through line 4-4 of FIG. 1.

Referring now to the appended drawings, an egress window assembly 10 is seen in a line of windows in a passenger vehicle, specifically, a bus or alternatively a train car or the like. Egress window assembly 10 comprises a circumferential outer frame 12 forming an auxiliary egress opening 14 for the motor vehicle passenger compartment. The outer frame 12 includes an outer frame member 16 whose inner surface 18 defines much of egress opening 14 and is continuous about the whole circumference or perimeter of the egress opening. A pair of striker pins 20, 22 are mounted directly to the outer frame member. As best seen in FIG. 3, striker pin 22 is directly mounted to inner frame member 16 with the aid of a mounting or anchor plate 68. Alternative direct and indirect mounting methods for the striker pins will be apparent to those skilled in the art given the benefit of this disclosure. The striker pins are oriented to extend radially inwardly from the inner surface 18 of the outer frame member 16. The striker pins are equally spaced along the lower horizontal portion of the outer frame member 16. As discussed further below, the corresponding egress latches are likewise spaced evenly along the lower horizontal portion of inner frame member 24 of the inner frame unit 26, so as to be aligned for latching with the striker pins. Inner frame unit 26 is mounted to outer frame 12 via hinge attachment 28 (see FIG. 4) extending horizontally along the upper horizontal portions of the inner and outer frames. More specifically, inner frame unit 26 includes a downwardly open inner frame hinge hook 30 extending from the inner frame member 24 along an upper horizontal portion of the inner frame member. The outer frame hinge hook 32 is seen to be upwardly open and to receive downwardly open hinge hook 30 of the inner frame in a manner adapted to allow the inner frame to swing outwardly upon being unlatched.

Figure 2:
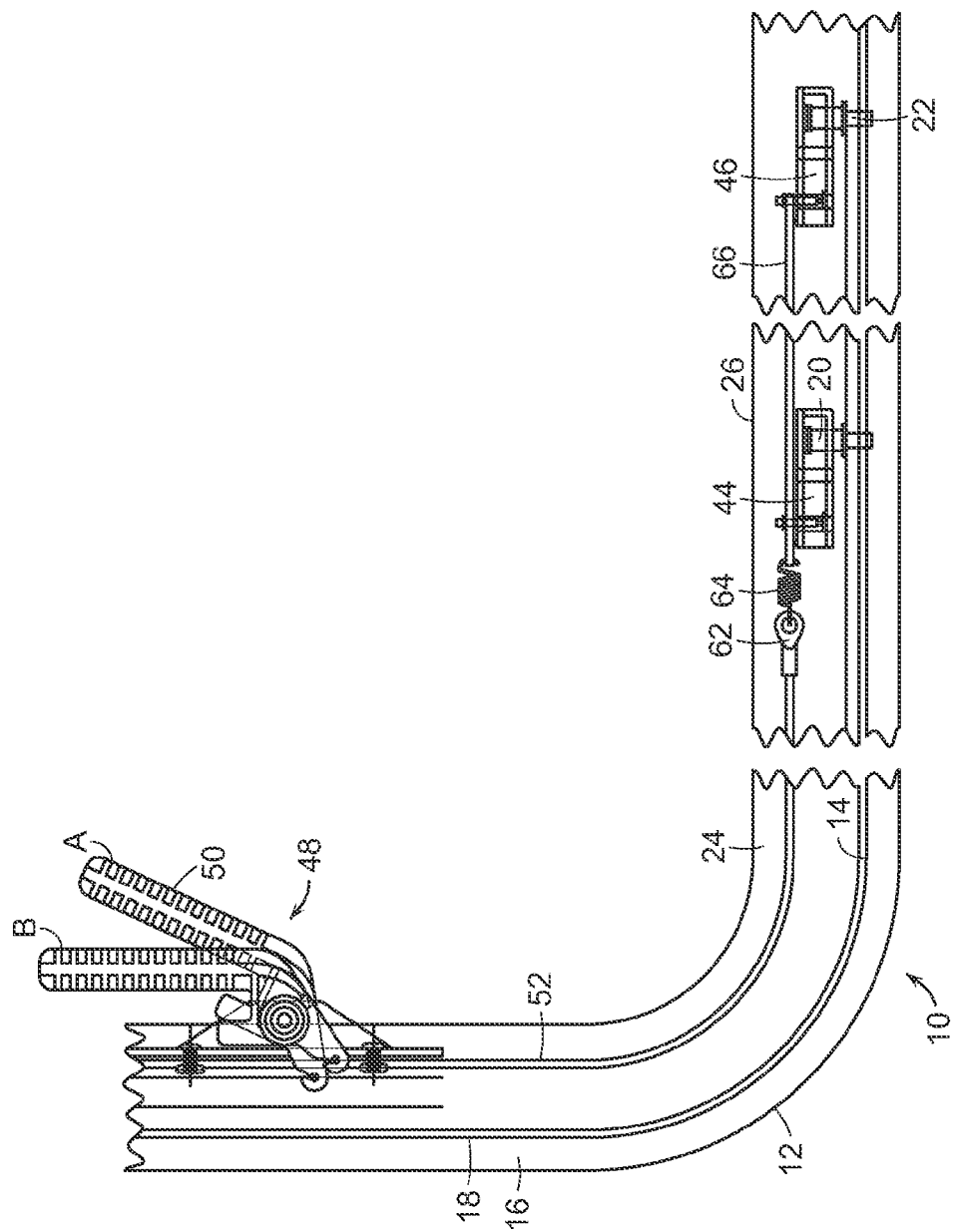
FIG. 2 is a schematic elevation view, partially broken away, of the inner frame, outer frame and latch mechanism of the egress window of FIG. 1.
Figure 7:
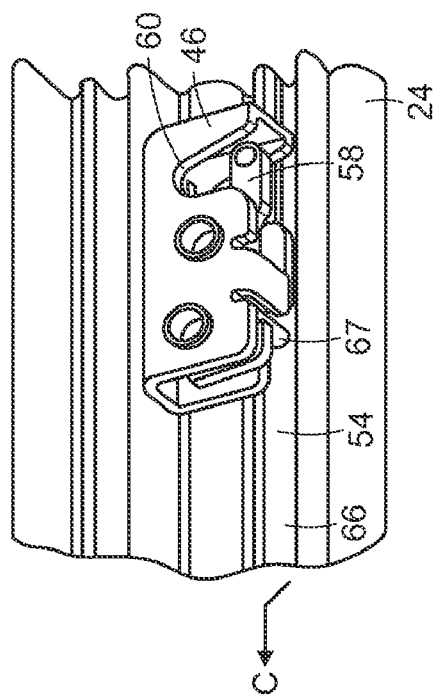
FIG. 7 is a schematic perspective view, partially broken away, of selected components of a latch mechanism in accordance with an alternative embodiment, shown in assembly with frame elements of an egress window in accordance with the present disclosure.
Figure 5:
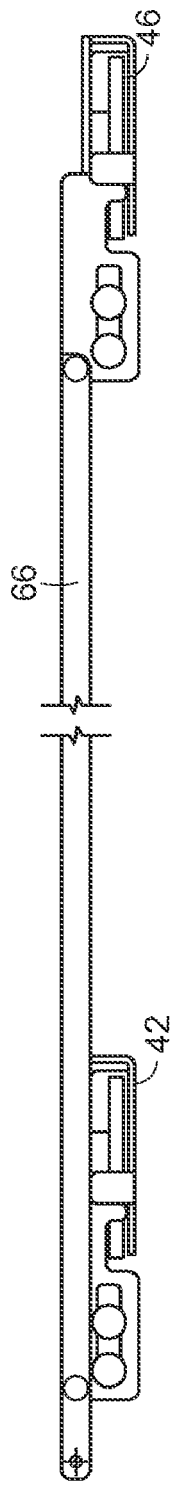
FIG. 5 is a schematic plan view, partially broken away, of components of the latch mechanism of the egress window of FIGS. 1-4.
Figure 6:
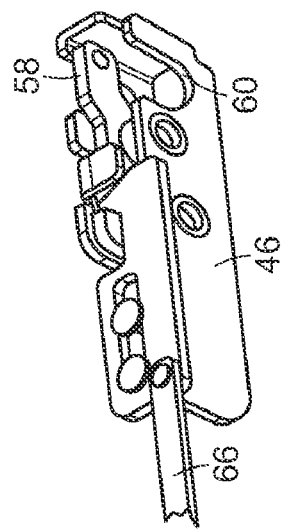
FIG. 6 is an enlarged schematic perspective view, partially broken away, of latch and linkage components of the latch mechanism of FIG. 5.

Inner frame unit 26 is seen to carry multiple glazing panes. Specifically, inner glazing pane 34 is a sacrificial pane readily removed and replaced in the event of being scratched, marred by graffiti or the like. Outer pane 36 is held by inner frame member 24 with suitable weather seals 38, 39. Inner pane 34 is held by somewhat resilient mounting member 40 having bendable lip 42 suitable for insertion and removal of glazing pane 34. As mentioned above, inner frame 26 includes egress latches corresponding to the striker pins of the outer frame. More specifically, as best seen in FIGS. 2 and 3, egress latches 44 and 46 are carried on the lower horizontal portion of inner frame 26 in alignment with striker pins 20, 22. Release mechanism 48 includes release handle 50 shown in its latch position B and release position A in FIG. 2. Release handle 50 is manually operable and is seen to be mounted to the circumferential inner frame 24 at an elevated position along the left vertical side portion of inner frame member 26. Handle 50 is operatively connected to first egress latch 44 by flexible cable 52 extending in a rail 54 extending circumferentially from handle 50 to first egress latch 44 and beyond. Flexible cable 52 and the other linkage of the release mechanism is not visible to a passenger in the vehicle when the inner frame is in its closed position, that is, when the egress latches are latched to the striker pins. As seen in FIG. 1, a decorative fascia 56 can be provided at the lower horizontal portion of the window assembly in order to provide a consistent appearance with adjacent (non-egress) window assemblies. Optionally, a corresponding fascia 57 (see FIG. 4) can be provided at the upper horizontal and/or vertical portions of the window assembly. Referring now to FIGS. 5-7, the egress latches preferably are rotary slam latches with a rotary member 58 which secures a corresponding striker pin in recess 60 until actuated by release handle 50. More specifically, actuation of release handle 50 pulls the end 60 of flexible cable 52 to the left (as illustrated in FIGS. 2, 5, 6 and 7). Tension element 64 can absorb any slack in cable 52 and also allows over-travel of handle 50 from the latched position B beyond the intended unlatched position A. Flexible cable 52 releases latch 44 and linkage member 66 also essentially simultaneously releases egress latch 46. As best seen in FIG. 7, an upstanding pin 67 is attached to rigid link member 66. Pin 67 actuates release latch 46 upon movement of rigid link member 66 in direction C (see FIG. 7), that is, to the left as illustrated in the drawings. A corresponding release pin is attached to the linkage from release handle 50 to first egress latch 44. One or both latches 44 and 46 includes a bias member suitable to urge the latch (when unlatched) away from the striker pin and, therefore, to urge the bottom of the inner frame outwardly (i.e., towards the left as viewed in FIG. 3).

Various auxiliary sealing members are used as appropriate in the window assembly 10, such as, e.g., glue, sealant or double-sided sticky tape 70 to assist in fixing the outer frame 12 to a vehicle body sill or structural member 72. Similarly, sealant, glue or tape 78 is employed at the upper header member 80 of the vehicle body. It should be recognized that vehicle body members 72, 80 and similar such structure extending vertically at the sides cooperate to form a gross window opening in the vehicle body which receives egress window assembly 10.

The inner frame and outer frame are radially overlapping in the embodiment illustrated in the drawings. Frame overlap 82 (see FIG. 3) with seal 84 assist in providing good resistance to the infiltration or intrusion of wind, noise and contaminants. In the particular embodiment illustrated in the drawings, radial overlap also is provided on the in-board side of the egress window assembly 10. More specifically, as best seen in FIG. 3, outer frame member 16 has a radially inward extending flange 90 on its in-board side. Flange 90 presents an outboard facing surface 92 with a seal 94 against which a corresponding portion of the inner frame member seats in the closed position.

As noted above, the outer frame and the inner frame each may optionally comprise one or more supplemental frame members, in the particular embodiment illustrated in the drawings, outer frame 12 comprises supplemental frame member 96 which includes hook member 32 and is secured to the outer frame via fasteners 98. Numerous alternative designs for the various frame members forming the outer frame and for the various frame members forming the inner frame, along with the striker pins, latches, latch handle and other components, will be apparent to those skilled in the art given the benefit of this disclosure.

While certain particular embodiments of the invention have been illustrated and described, it will be apparent to those skilled in the art, given the benefit of this disclosure, that numerous modifications and additions can be made without departing from the true spirit and scope of the invention. Accordingly, it is not intended that the invention be limited except in accordance with the terms of the following claims. In the following claims, definite and indefinite articles such as "the," "a," "an," and the like, in keeping with traditional patent law and practice, mean "at least one" of the item. In general, unless expressly stated otherwise, all words and phrases used in the disclosure above and in the following claims are intended to have all of their various different meanings, including, without limitation, any and all meaning(s) given in general purpose dictionaries, and also any and all meanings given in science, technology or engineering dictionaries, and also any and all meanings known in the relevant industry, technological art or the like. Thus, where a term has more than one possible meaning, all such meanings are intended to be included for that term as used here unless nonsensical or inconsistent with the disclosed principles of the invention. In that regard, it should be understood that if a device, system or method has the item called for in a claim below (i.e., it has the particular feature or element called for), and also has one or more others of that general type of item but not specifically as called for in the claim, then the device, system or method in question satisfies the claim requirement. Those one or more other items are simply extra and can be ignored in determining whether the device, system or method in question satisfies the claim requirement.

We claim:

1. A motor vehicle egress window comprising, in combination:
   a. an outer frame forming an auxiliary egress opening for a motor vehicle passenger compartment, the egress opening having a horizontal upper portion and a horizontal lower portion, each being straight and parallel with one another, and a vertical left side portion and a vertical right side portion, each being straight and parallel with one another, wherein the outer frame comprises
      i. a one-piece outer frame member having a continuous inner surface extending circumferentially along at least the vertical left side portion, horizontal lower portion and vertical right side portion,
      ii. multiple striker pins mounted directly to the outer frame member along the horizontal lower portion and oriented to extend radially inwardly from the molded inner surface, and
      iii. an upwardly open outer frame hinge hook extending along the horizontal upper frame portion; and
   b. an inner frame unit hingedly mounted to the outer frame for movement between a closed position in which it closes the auxiliary egress opening formed by the outer frame and an open position, comprising
      i. a one-piece inner frame member having a circumferentially continuous molded surface configured to mate with a corresponding portion of the inner surface of the outer frame member when the inner frame is in the closed position,
      ii. at least one glazing pane mounted in the inner frame,
      iii. multiple rotary slam latches, each mounted to a horizontal lower portion of the inner frame member and operative when the inner frame is in the closed position to latch to a corresponding one of the striker pins of the outer frame to releasably hold the inner frame unit in the closed position,
      iv. a release mechanism comprising
         a manually operative release handle mounted to a vertical side portion of the inner frame, and
         release linkage comprising
            a flexible cable extending in a circumferentially extending rail of the inner frame at least from the release handle to a first one of the rotary slam latches mounted to the horizontal lower portion of the inner frame, and
            a rigid link member extending from the first one of the rotary slam latches to a second of the of the rotary slam latches,
         the release mechanism being operative upon operation of the release handle to simultaneously unlatch the multiple rotary slam latches to release the striker pins to free the inner frame unit to move to the open position, and
      v. a downwardly open inner frame hinge hook extending from the inner frame member along an upper horizontal portion of the inner frame member and received by the outer frame hinge hook.

2. The motor vehicle egress window of claim 1 wherein each of the multiple rotary slam latches comprises a biasing member operative upon actuation of the latch to urge the inner frame unit toward the open position.

3. The motor vehicle egress window of claim 1 wherein the outer frame further comprises at least one circumferentially extending supplemental outer frame member.

4. The motor vehicle egress window of claim 3 wherein the supplemental outer frame member is fully circumferential around the auxiliary egress opening.

5. The motor vehicle egress window of claim 3 wherein the inner frame unit comprises multiple glazing panes, including at least an outer pane and a removable, sacrificial inner pane parallel with the outer pane.

6. The motor vehicle egress window of claim 3 wherein the inner frame unit and the outer frame radially overlap each other.

7. The motor vehicle egress window of claim 6 wherein the inner frame unit opens to outboard, and the outer frame unit has an inboard, radially inward extending surface against which a corresponding portion of the inner frame unit seats in the closed position.

8. The motor vehicle egress window of claim 1 wherein the continuous inner surface of the outer frame member is a molded surface.

9. The motor vehicle egress window of claim 1 wherein the egress latches are evenly spaced along the horizontal lower portion of the inner frame.

10. The motor vehicle egress window of claim 1 wherein the inner frame unit is mounted to the outer frame for movement also from the open position to the closed position.

11. The motor vehicle egress window of claim 1 wherein the inner frame unit is hinged to the outer frame for movement also from the open position to the closed position.

12. A motor vehicle egress window for insertion into an auxiliary egress opening comprising, in combination:
   a. an outer frame member having at least a first striker pin mounted thereto; and
   b. an inner frame unit mounted for movement relative to the outer frame member between a closed position in which it closes the auxiliary egress opening and an open position, comprising
      i. a circumferential inner frame,
      ii. a glazing pane mounted to the circumferential inner frame,
      iii. at least a first egress latch mounted to the circumferential inner frame and operative when the inner frame unit is in the closed position to latch to the first striker pin of the outer frame to hold the inner frame unit in the closed position, and
   iv. a release mechanism comprising
      a manually operative release handle mounted to the circumferential inner frame, having a latched position and an unlatched position, and
      release linkage comprising at least a first link extending circumferentially along the inner frame from the release handle to the first egress latch, operative upon operation of the release handle from the latched position to the unlatched position to open the first egress latch to release the striker pin to free the inner frame unit to move to the open position.

\* \* \* \* \*